(12) United States Patent
Gulbranson

(10) Patent No.: US 8,308,172 B2
(45) Date of Patent: Nov. 13, 2012

(54) SEATED SKIING OR SNOWBOARDING DEVICE

(76) Inventor: Erikka Gulbranson, Long Beach, CA (US)

( * ) Notice: Subject to any disclaimer, the term of this patent is extended or adjusted under 35 U.S.C. 154(b) by 231 days.

(21) Appl. No.: 12/685,796

(22) Filed: Jan. 12, 2010

(65) Prior Publication Data

US 2010/0109310 A1    May 6, 2010

Related U.S. Application Data

(63) Continuation of application No. 11/827,819, filed on Jul. 13, 2007, now abandoned.

(51) Int. Cl.
*A63C 5/03* (2006.01)
(52) U.S. Cl. .................... 280/14.1; 280/21.1; 280/28.14
(58) Field of Classification Search ................. 280/14.1, 280/21.1, 27, 28.14, 14.22
See application file for complete search history.

(56) References Cited

U.S. PATENT DOCUMENTS

| | | |
|---|---|---|
| D93,132 S | 8/1934 | Richards |
| 3,003,778 A | 10/1961 | Taggart |
| 3,026,120 A | 3/1962 | Guerard |
| D197,847 S | 3/1964 | Kerncik |
| 3,123,844 A | 3/1964 | Bailey |
| 3,190,668 A | 6/1965 | Husak |
| D202,055 S | 8/1965 | Kaup |
| D202,116 S | 8/1965 | Thomas |
| D205,296 S | 7/1966 | Cohen |
| D205,297 S | 7/1966 | Cohen |
| D206,011 S | 10/1966 | Price |
| D206,598 S | 1/1967 | Price |
| 3,297,334 A | 1/1967 | Jenks |
| 3,325,179 A | 6/1967 | Bissett |
| D211,378 S | 6/1968 | Deshong |
| D215,458 S | 9/1969 | Latch |
| 3,545,785 A | 12/1970 | Brenter |
| 3,632,125 A | 1/1972 | Krippelz |
| 3,744,811 A | 7/1973 | Johnston |
| 3,778,077 A | 12/1973 | Johnson |
| 3,799,564 A | 3/1974 | Eisenschmid |
| D232,164 S | 7/1974 | Bemis |
| 3,830,513 A | 8/1974 | Hunt |
| 3,897,078 A | 7/1975 | Melnick |
| 3,917,301 A | 11/1975 | Fabris |
| 4,129,313 A | 12/1978 | Benson |
| D254,363 S | 3/1980 | Joyce |
| 4,193,609 A | 3/1980 | Bissett |
| 4,199,162 A | 4/1980 | Joy |
| 4,310,169 A | 1/1982 | Brough |

(Continued)

OTHER PUBLICATIONS

Hammacher Schlemmer; Steerable Upright Snow Racer; www.hammacher.com; Copyright 2007.

*Primary Examiner* — Jeffrey J Restifo
(74) *Attorney, Agent, or Firm* — Stetina Brunda Garred & Brucker

(57) ABSTRACT

A seated skiing device having an adjustable heel protrusion and a fixed toe protrusion is provided. The distance between the toe and heel protrusions are adjustable such that the seated skiing device may engage toe and heel bindings of a snow ski set to a riders ski boot. In this manner, the seated skiing device is engageable to the snow ski of the rider without any additional tools. Also, a seated snowboarding device is disclosed herein. The seated snowboarding device is removably attachable to standard front and rear bindings of a snowboard.

17 Claims, 7 Drawing Sheets

U.S. PATENT DOCUMENTS

| | | |
|---|---|---|
| 4,324,409 A | 4/1982 | Larsen et al. |
| 4,349,208 A | 9/1982 | Merrill |
| D282,057 S | 1/1986 | Krovina |
| 4,632,408 A | 12/1986 | Olpp |
| D291,427 S | 8/1987 | Schaller |
| 4,722,539 A | 2/1988 | Molinaro |
| 4,824,139 A | 4/1989 | Robbins |
| D303,416 S | 9/1989 | Strauss |
| 4,865,572 A | 9/1989 | Andes |
| 4,886,283 A | 12/1989 | Wells |
| D322,052 S | 12/1991 | Prox |
| D325,765 S | 4/1992 | Grantz |
| 5,116,067 A | 5/1992 | Johnson |
| D328,576 S | 8/1992 | Weiss |
| D331,032 S | 11/1992 | Bowen |
| D349,412 S | 8/1994 | Fallon |
| 5,344,167 A | 9/1994 | Strouth |
| D366,922 S | 2/1996 | Doty, Jr. |
| D374,641 S | 10/1996 | Gaul |
| 5,566,959 A | 10/1996 | Tiramani |
| D389,210 S | 1/1998 | Goodman |
| D405,142 S | 2/1999 | Benzel |
| 6,019,380 A | 2/2000 | Goodman |
| 6,036,202 A | 3/2000 | LaCome |
| 6,113,115 A | 9/2000 | Hurth |
| 6,179,305 B1 | 1/2001 | Capozzi |
| 6,416,065 B1 | 7/2002 | Bibollet |
| 6,431,562 B1 * | 8/2002 | Vontobel ................ 280/28.14 |
| D466,834 S | 12/2002 | Oldendorph |
| 6,736,414 B2 * | 5/2004 | Farrally-Plourde ............ 280/16 |
| 6,783,134 B2 * | 8/2004 | Geary ..................... 280/21.1 |
| 6,905,128 B1 | 6/2005 | Lear et al. |
| 6,969,074 B2 | 11/2005 | Piper |
| 7,090,227 B2 | 8/2006 | Morin |
| 7,232,133 B2 * | 6/2007 | Stevens ..................... 280/16 |
| 7,457,724 B2 | 11/2008 | Vock et al. |
| 7,547,023 B2 * | 6/2009 | Yau ........................ 280/16 |
| 7,922,206 B2 * | 4/2011 | Kriezel ..................... 280/845 |
| 2006/0027982 A1 | 2/2006 | Smith et al. |

* cited by examiner

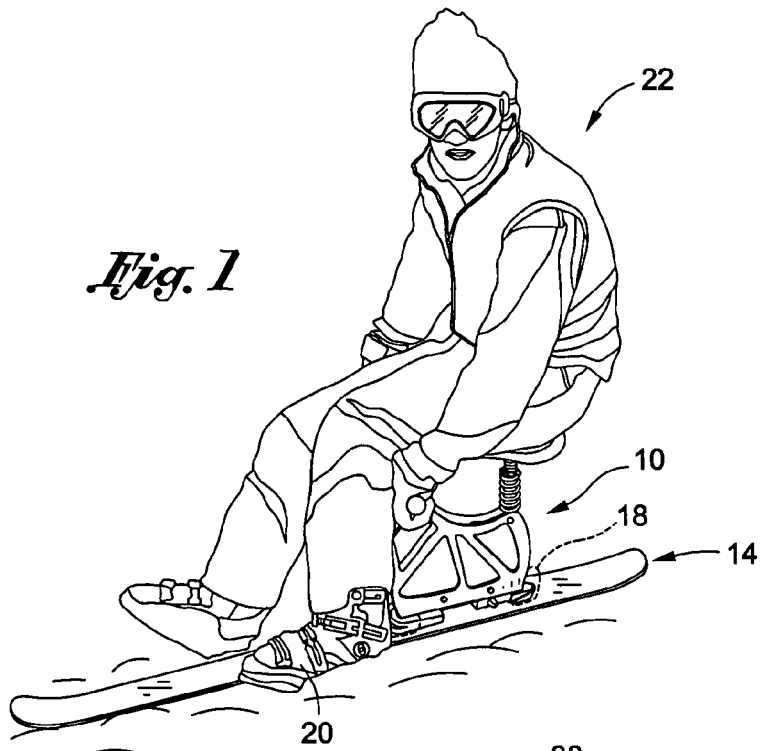
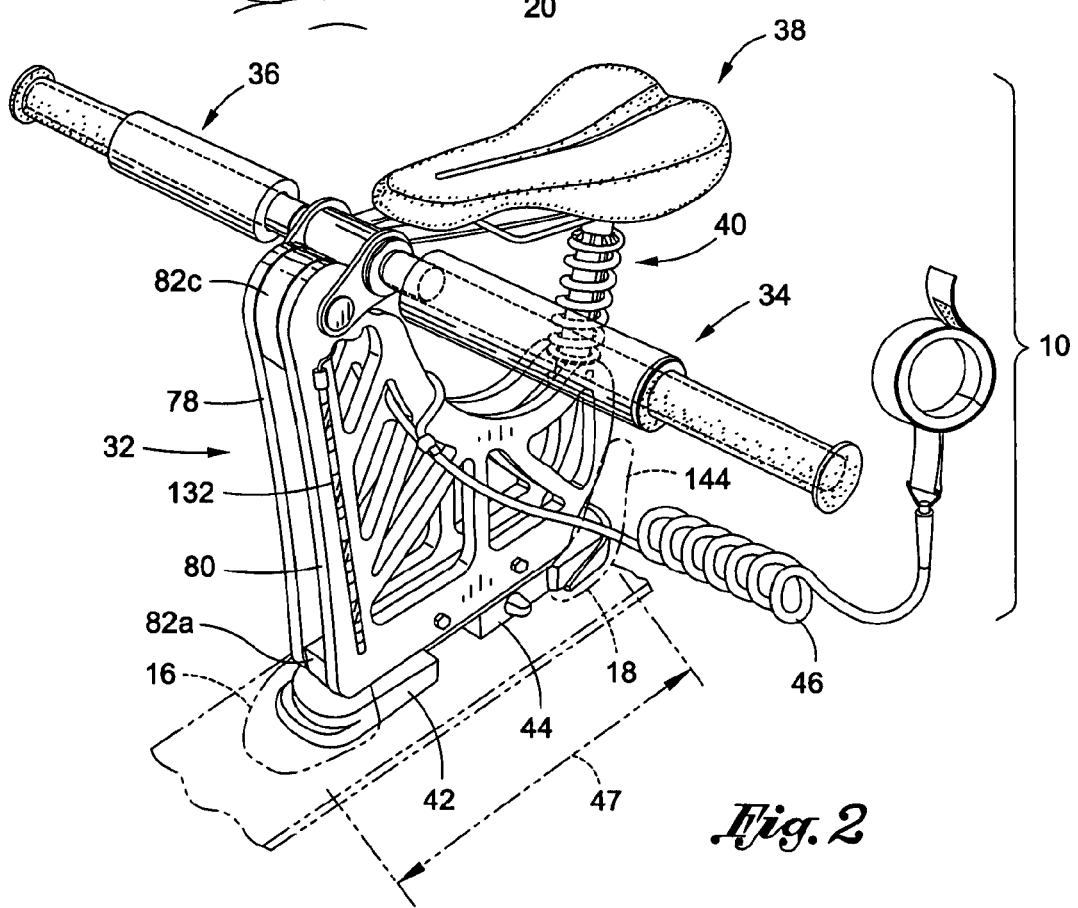

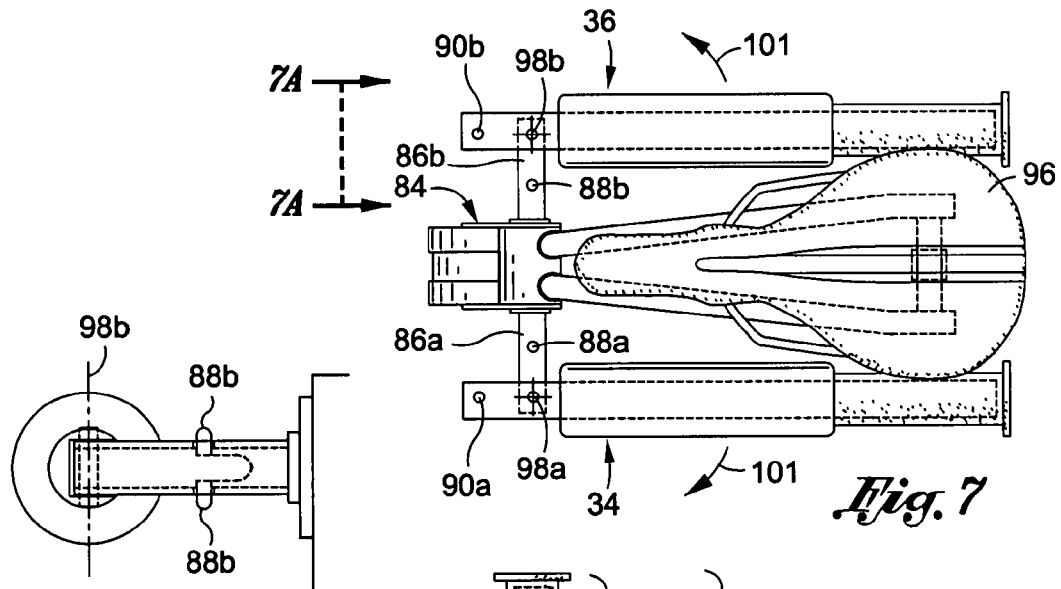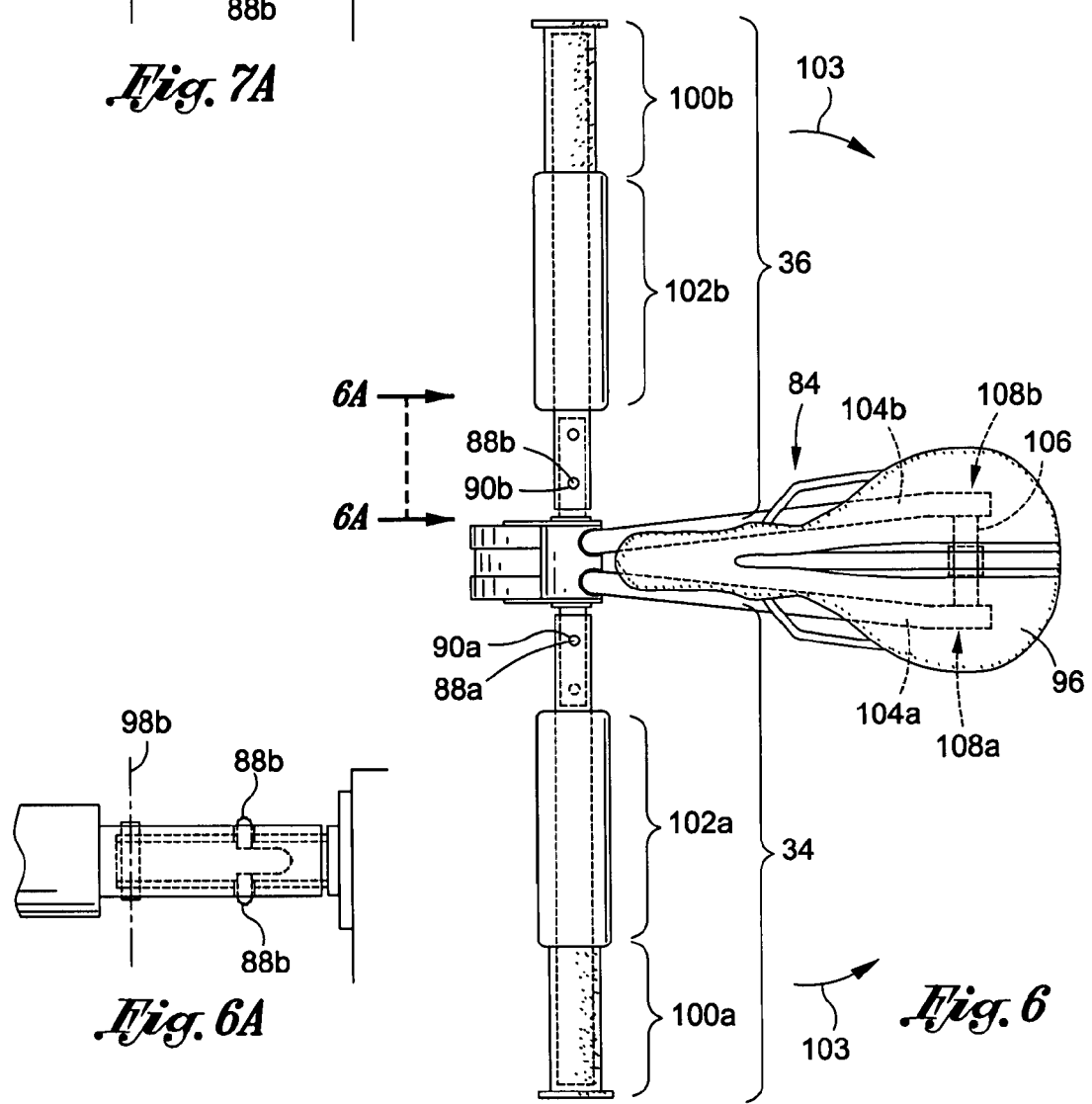

SEATED SKIING OR SNOWBOARDING DEVICE

CROSS-REFERENCE TO RELATED APPLICATIONS

The present application is a continuation of U.S. patent application Ser. No. 11/827,819 entitled SEATED SKIING OR SNOWBOARDING DEVICE filed Jul. 13, 2007 now abandoned.

STATEMENT RE: FEDERALLY SPONSORED RESEARCH/DEVELOPMENT

Not Applicable

BACKGROUND

The present invention relates to a device for traversing down a snow-covered downhill terrain while in a seated position.

There are numerous seated downhill snow riding devices in the prior art. For example, U.S. Pat. No. 6,179,305 (hereinafter '305 patent) illustrates a seated downhill snow riding device for a physically challenged person. As understood, the seat assembly is attached to the standard mounting holes of the snowboard. U.S. Pat. No. 3,917,301 illustrates another seated downhill snow riding device wherein a seat assembly is attached to a snow ski instead of a snowboard. As understood, the seat assembly is attached to the snow ski via front and rear custom brackets fixably attached to the snow ski. U.S. Pat. No. 4,193,609 (hereinafter the '609 patent) also illustrates a seated snow riding device wherein a seat assembly is attached to the snow ski via a customized interface between the snow ski and the seat assembly. Unfortunately, these prior art seated downhill snow riding devices require a customized interface between the seat assembly and the snow ski or snowboard. Accordingly, one is not able to choose between riding down the snow-covered downhill terrain in the seated position or switching to the standard upright position without additional tools.

Another deficiency of prior art seated downhill snow riding devices is related to their bulkiness making them hard to transport. By way of example and not limitation, the devices shown in the '305 patent, the '609 patent and U.S. Pat. No. 6,036,202 (hereinafter '202 patent) are very bulky. In particular, the rider must carry the seat assembly as well as the snowboard or snow ski. These devices would be difficult to carry while skiing or snowboarding down a snow-covered downhill terrain in the upright position. Moreover, the devices shown in the '202 patent and the '609 patent appear to have side skis or side poles. The rider must carry these devices as well as the seat assembly and snow ski or snowboard. The device shown in the '301 patent attempts to alleviate the bulkiness of the prior art seated downhill snow riding devices by providing a collapsible seat assembly. However, the rider must still carry the snow ski or the snowboard along with the seat assembly albeit in a folded position. Accordingly, it would be impracticable for the rider to carry a set of equipment for riding down the downhill snow-covered terrain in the upright position and a separate second set of equipment for riding down the downhill snow-covered terrain in a seated position such that the rider can switch between the seated and upright positions while on the mountain.

Moreover, the device shown in U.S. Pat. No. 4,193,609 (hereinafter '609 Patent) has handlebars but protrude our laterally so as to increase the bulkiness of the seat assembly. In particular, the handle of the '609 device is fixedly attached to a base of the device. The handlebars extend out laterally beyond the seat of the seat assembly. Accordingly, the device of the '609 patent is inconvenient to carry.

Another deficiency with respect to prior art seated downhill snow riding devices is that they are boring to watch as the rider traverses down the snow-covered downhill terrain. Additionally, the prior art seated downhill snow riding devices are boring to ride in that they are not configured to provide music to the rider for listening to music while the rider is traversing down the snow-covered downhill terrain.

Accordingly, there is a need in the art for an improved seated downhill snow riding device.

BRIEF SUMMARY

The seated skiing and snowboarding devices described herein addresses the problems discussed above, discussed below and those that are known in the art.

The seated skiing device may have a toe protrusion and a heel protrusion which are adjustable so as to fit within toe and heel bindings of a snow ski adjusted to a ski boot of a rider. In particular, the heel protrusion of the seated skiing device may be slid closer to the toe protrusion or slid further away from the toe protrusion and locked in place. The distance between the toe protrusion and the heel protrusion is adjusted and locked in place to fit the toe and heel bindings of the snow ski. In this manner, the skier may disengage his/her ski boots from the snow ski and engage the seated skiing device to the snow ski to ride down the snow covered downhill terrain in the seated position. The rider may alternate between riding down the snow covered downhill terrain in the seated position with the seated skiing device or in the traditional upright position by engaging his/her ski boot to the snow ski.

In an aspect of the seated skiing device, the same may have collapsible handle and thigh bars. The collapsible handle and thigh bars may be traversable between a collapsed position and an extended position. The rider may traverse the handle and thigh bars to the collapsed position for stowing the seated skiing device in a backpack. To ride down the snow covered downhill terrain in the seated position, the seated skiing device is removed from the backpack, the handle and thigh bars are traversed to the extended position and the seated skiing device is engaged to the snow ski.

In an aspect of the seated skiing device, the same may incorporate a shock absorber for providing comfort to the skier while riding down the snow covered downhill terrain in the seated position.

In an aspect of the seated skiing device, the same may also additionally have a leash attached to the seated skiing device and removably attachable to a leg or arm of the skier.

The seated snowboarding device may have a front protrusion and a rear protrusion which are removably attachable to traditional front and rear bindings of a snowboard. The seated snowboarding device may have all of the features discussed herein in relation to the seated skiing device except for the toe protrusion and the heal protrusion.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an illustration of a skier riding down a snow covered downhill terrain in the seated position with a seated skiing device attached to a snow ski;

FIG. 2 is an enlarged perspective view of the seated skiing device shown in FIG. 1;

FIG. 6 is a top view of the seated skiing device shown in FIG. 2;

FIG. 6A is an enlarged view of a right handle and thigh bar;

FIG. 7 illustrates a collapsed position of the left and right handle and thigh bars shown in FIG. 6;

FIG. 7a is an enlarged view of the right handle and thigh bar in the collapsed position;

DETAILED DESCRIPTION

Figure 12:
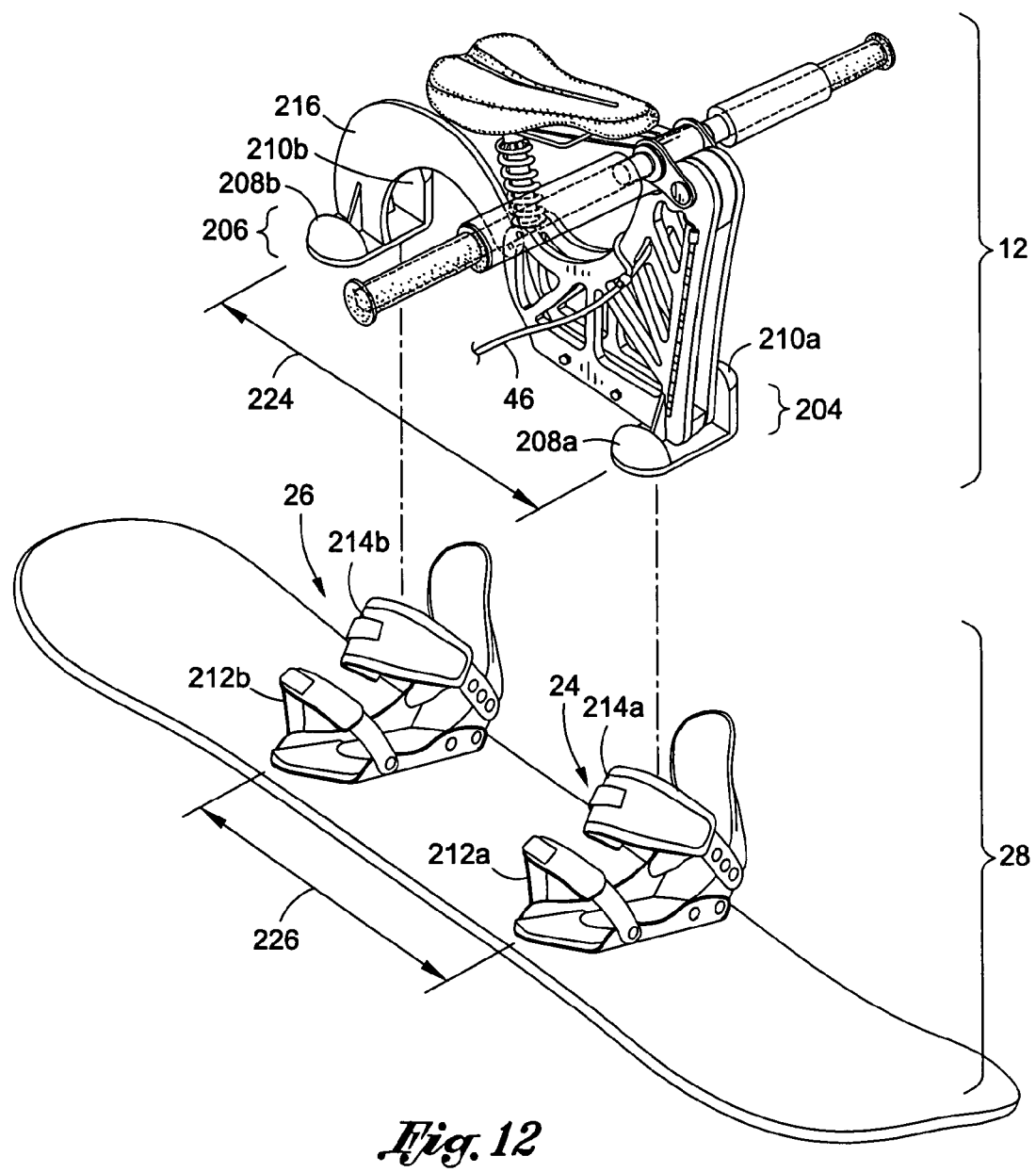
FIG. 12 is a perspective view of a seated snowboarding device removably attachable to standard front and rear bindings of a snowboard.

Referring now to the drawings, the same illustrates a seated skiing device 10 (see FIG. 1) and a seated snowboard device 12 (see FIG. 12). The seated skiing device 10 may be removably to a snow ski 14 with toe and heel bindings 16, 18 set to the ski boot 20 of the skier 22. Similarly, the seated snowboard device 12 may be removably attachable to front and rear bindings 24, 26 of a snowboard 28 with the front and rear bindings 24, 26 set to the stance of the snowboarder. Accordingly, the seated skiing and snowboard devices 10, 12 may be respectively removably attachable to the snow ski 14 and snowboard 28 as desired. As such, the rider may choose to ride down a snow covered downhill terrain in the traditional upright position with his/her snow ski 14 or snowboard 28. Also, at the appropriate time, as desired, the skier 22 or snowboarder may decide to ride down the snow covered downhill terrain in a seated position by engaging the seated skiing device 10 to the snow ski 14 or the seated snowboard device 12 to the snowboard 28. The skier 22 or snowboarder may alternate between riding down the snow covered downhill terrain in the standard traditional upright position or in the seated position.

Referring now to FIG. 1-9, the seated skiing device 10 may have a frame 32, left and right handle and thigh bars 34, 36, a seat assembly 38, a shock assembly 40, and adjustable toe and heel protrusions 42, 44. Also, the seated skiing device 10 may have a leash 46.

Figure 3:
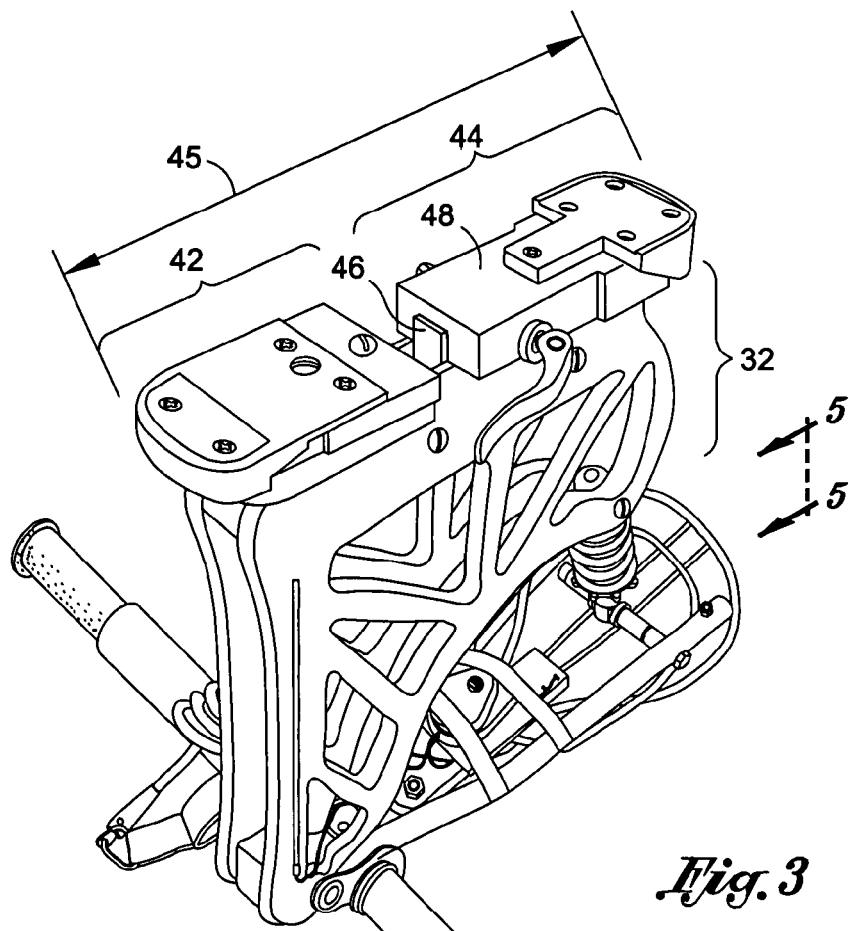
FIG. 3 is an enlarged bottom perspective view of the seated skiing device shown in FIG. 2.

As shown in FIG. 3, the toe protrusion 42 may be fixedly attached to the frame 32. The toe protrusion 42 may be sized and configured to engage the toe bindings 16. Similarly, the heel protrusion 44 may be sized and configured to engage the heel binding 18. Moreover, the heel protrusion 44 may be adjustably attached to the frame 32 such that a distance 45 (see FIG. 3) between the toe and heel protrusions 42, 44 may be adjusted so as to be equal to a distance 47 (see FIG. 2) between the toe and heel bindings 16, 18. In this manner, the toe and heel protrusions 42, 44 are adjusted to the toe and heel bindings 16, 18 already adjusted to the preferences of the skier 22. The toe and heel bindings 16, 18 are not adjusted to the requirements of the toe and heel protrusions 42, 44. Accordingly, the toe and heel protrusions 42, 44 of the seated skiing device 10 or the ski boot 20 of the skier 22 may be selectively engaged to the toe and heel bindings 16, 18 of the snow ski.

Figure 4:
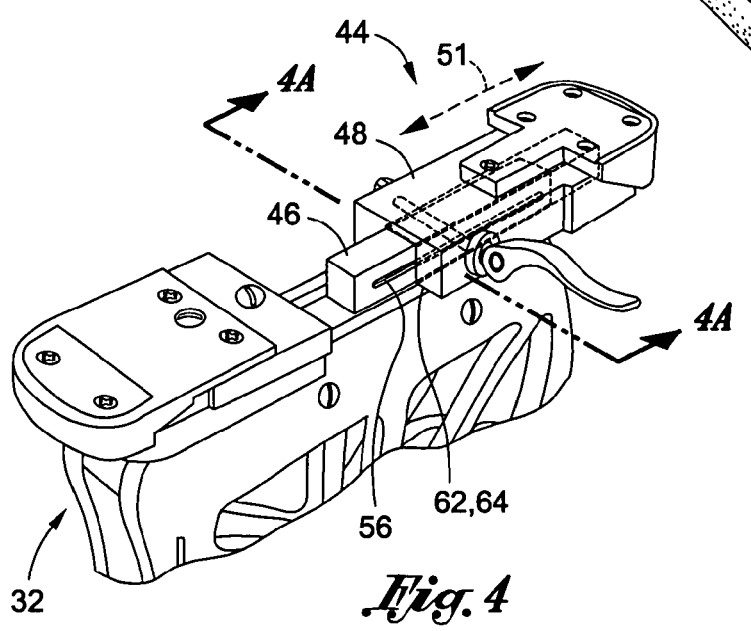
FIG. 4 is an enlarged view of a heel protrusion adjustably attached to a frame of the seated skiing device shown in FIG. 3.

The heel protrusion 44 may be adjustably attached to the frame 32 in that the heel protrusion 44 may be slid closer to the toe protrusion 42 and locked in place or slid away from the toe protrusion 42 and locked in place, as shown by arrow 51 in FIG. 4. The position of the heel protrusion 44 depends on the setting of the toe and heel bindings 16, 18 of the snow ski 14. To achieve the slide and lock feature of the heel protrusion 44 to the frame 32, an elongate block 46 may be fixedly secured to an underside of the frame 32. The heel protrusion 44 may additionally have an extension 48. The extension 48 of the heel protrusion 44 may have a channel 50 (see FIG. 4A) sized and configured to receive the elongate block 46. The elongate block 46 may slide in a longitudinal direction into or out of the channel 50, as shown by arrow 51 (see FIG. 4). The extension 48 may have aligned apertures (e.g., circular hole) 52 formed in opposed walls 54a, b which defines the channel 50. The elongate block 46 may have a mating elongate slot 56 (see FIG. 4) which is aligned to the apertures 52 formed in the opposed walls 54a, b. A fastener 58 (see FIG. 4A) having an elongate bolt 60 may be inserted through the apertures 52 of the opposed walls 54a, b and the elongate slot 56 of the elongate block 46. When the elongate bolt 60 is inserted through the apertures 52 and the elongate slot 56, the heel protrusion 44 does not substantially wiggle in the vertical up and down direction. The reason is that the extension 48 defines an upper surface 62 which may contact a lower surface 64 of frame 32. The elongate bolt 60 of the fastener 58 holds the upper surface 62 of the extension 48 against the lower surface 64 of the frame 32. The heel protrusion 44 may be slid closer to the toe protrusion 42 or further away from the toe protrusion 42. To this end, the elongate bolt 60 slides within the elongate slot 56. When the distance between the toe and heel protrusions 42, 44 are properly adjusted to the toe and heel bindings 16, 18, the fastener 58 is tightened to lock the heel protrusion 44 in place. In particular, the opposed walls 54a, b are deflected inward against opposed sides 66a, b when the fastener 58 is tightened.

Figure 4A:
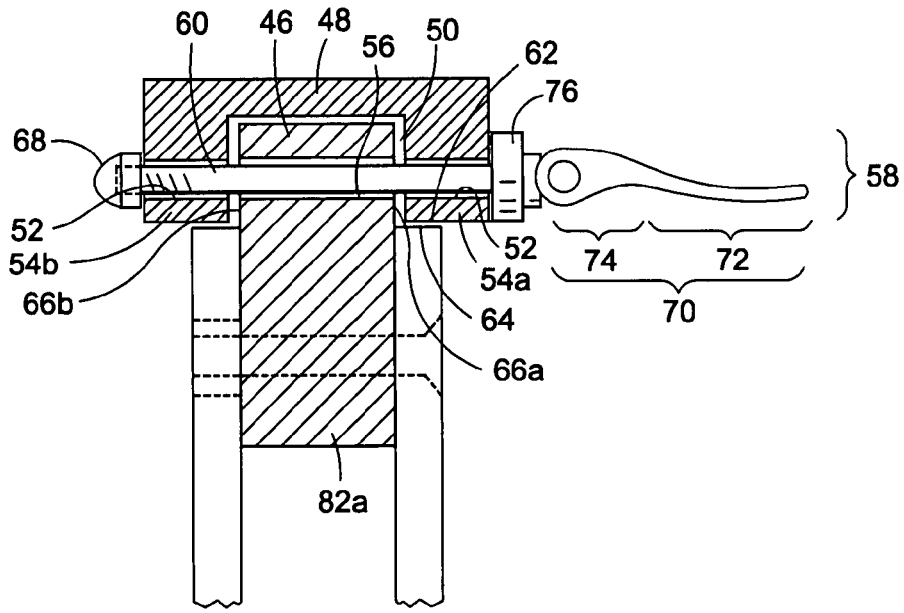
FIG. 4A is a cross sectional view of the heel protrusion shown in FIG. 4.

The fastener 58 may be a quick release lever such as is commonly found in modern bicycles, as shown in FIG. 4A. The quick release lever may have a nut 68, the elongate bolt 60, a lever 70 and a collar 76. The nut 68 may be attached to a first distal end of the elongate bolt 60. The lever 70 may be attached to an opposed second distal end of the elongate bolt 60. The lever may have a handle 72 and cam 74. The handle 72 is operative to rotate the cam 74 to loosen (see FIGS. 4 and 4A) or tighten (see FIG. 3) the quick release lever. In particular, the cam 74 draws the elongate bolt 60 toward the cam side when the lever 70 is traversed to a tightened position (see FIG. 3). Conversely, the cam 74 releases tension in the elongate bolt 60 when the handle 72 is traversed to a release position (see FIGS. 4 and 4A). Accordingly, the heel protrusion 44 may be slid and locked in the following manner. The handle 72 may be traversed to the released position to allow the distance 45 between the heel and toe protrusions 44, 42 to be adjusted. After the distance 45 between the toe and heel protrusions 42, 44 are adjusted, the handle 72 is traversed to the tightened position (see FIG. 3). The opposed walls 54a, b press against the opposed sides 66a, b thereby frictionally locking the heel protrusion 44 in place.

In an aspect of the seated skiing device 10, it is contemplated that the heel protrusion 44 be fixedly attached to the frame 32 and the toe protrusion 42 be adjustably attached to the frame 32 in that the toe protrusion 42 may be slid closer to the heel protrusion 44 and locked in place or slid away from the heel protrusion 44 and locked in place. The toe protrusion 42 may be adjustably attached to the frame 32 in the same manner that the heel protrusion 44 is adjustably attached to the frame 32 as discussed above.

The frame 32 may have a first plate 78 and a second plate 80, as shown in FIG. 2. The first and second plates 78, 80 may be spaced apart with various spacers 82a, b, c positioned between the first and second plates 78, 80. Spacer 82a may be positioned at a lower portion of the first and second plates 78, 80. The spacer 82a may be attached to the first and second plates 78, 80 with a nut and bolt, adhesive or other methods known in the art. The spacer 82b (see FIG. 5) may be positioned between the first and second plates 78, 80 at an upper rear portion of the first and second plates 78, 80. The spacer 82b may be attached to the first and second plates 78, 80 with two bolts 81a,b or other methods known in the art. The spacer 82c (see FIG. 2) may be positioned between the first and second plates 78, 80 at an upper front portion of the first and second plates 78, 80. The spacers 82a, b, c may be sized and configured to maintain a parallel relationship between the first and second plates 78, 80. To lighten the weight of the seated skiing device 10, the first and second plates 78, 80 may be hollowed out so as to form a web configuration.

The left and right handle and thigh bars 34, 36 (see FIGS. 6-7A) may be collapsible. In particular, left and right posts 86a, b (see FIG. 7) may be attached to a seat frame 84 immediately adjacent the upper front portion of the frame 32. The left and right posts 86a, b may extend out in opposed lateral directions from each other. Moreover, the left and right posts 86a, b may be aligned to each other and extend out perpendicularly with respect to a plane defined by the frame 32. The left and right handle and thigh bars 34, 36 may rotate to a collapsed position (see FIGS. 6 and 7).

In particular, the left and right handle and thigh bars 34, 36 may be pivoted rearward under a seat 96 (see FIG. 7). The left and right handle and thigh bars 34, 36 may be pivotable about pivot axis 98a, b of the left and right posts 86a, b. The left and right handle and thigh bars 34, 36 are pivotable between a collapsed position (see FIG. 7) and an extended position (see FIG. 6). To traverse the left and right handle and thigh bars 34, 36 to the collapsed position from the extended position, spring loaded buttons 88a, b are pushed inward and out of apertures 90a, b. The left and right handle and thigh bars 34, 36 may then be rotated rearward in the direction of arrow 103 (see FIG. 6) under the seat 96, as shown in FIG. 7. The left and right handle and thigh bars 34, 36 may then be secured to the frame 32 with a bungee cord or other fastening device. To traverse the left and right handle and thigh bars 34, 36 back to the extended position (see FIG. 6) from the retracted position, the fastening device is removed from the left and right handle and thigh bars 34, 36. The skier 22 then traverses or pivots the left and right handle and thigh bars 34, 36 about the pivot axis 98a, b in the direction of arrow 101 (see FIG. 7). The left and right handle and thigh bars 34, 36 are pivoted until the spring loaded buttons 88a, b are received back into the apertures 90a, b. At this point, the left and right handle and thigh bars 34, 36 are secured to the frame 32 in the extended position.

Alternatively, the left and right handle and thigh bars 34, 36 may be rotated in a downward direction so as to be positioned vertically with respect to the frame 32. To this end, the angular position of the left and right posts 86a, b are rotated ninety degrees. The left and right handle and thigh bars 34, 36 may be traversed between the extended position and the retracted position in the same manner that the left and right handle and thigh bars 34, 36 are traversed therebetween as discussed above.

Figure 8:
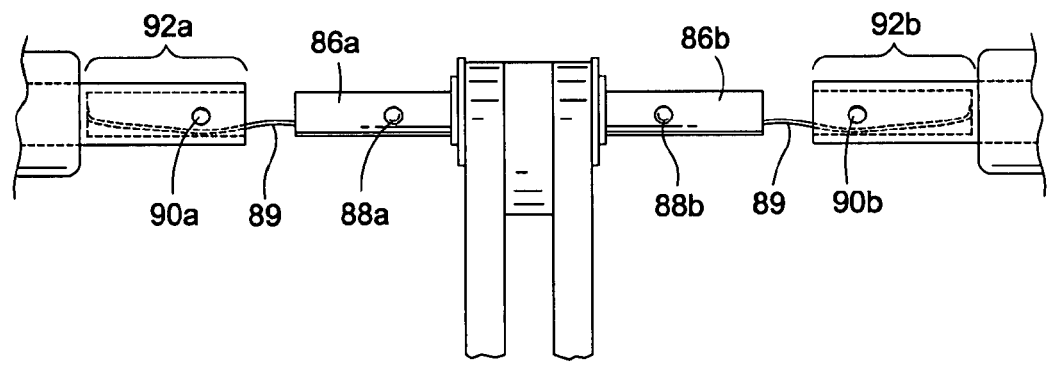
FIG. 8 illustrates an alternative means of attaching the left and right handle and thigh bars to the frame.

Alternatively, the left and right handle and thigh bars 34, 36 may be removably attachable to the left and right posts 86a, b, as shown in FIG. 8. When the skier 22 is riding down the snow-covered down hill terrain with the seated skiing device 10, the left and right handle and thigh bars 34, 36 are attached to the left and right posts 86a, b. When the skier 22 is riding down the snow-covered downhill terrain in the traditional upright position, the seated skiing device 10 is disposed within a large backpack. To this end, the left and right handle and thigh bars 34, 36 are detached from the left and right posts 86a, b and placed against the frame 32 such that the seated skiing device 10 may have a compact configuration so as to be disposable within the large backpack.

To attach or detach the left and right handle and thigh bars 34, 36 from the left and right posts 86a, b, the left and right posts 86a, b may have spring loaded buttons 88a, b. The left and right handle and thigh bars 34, 36 may have corresponding apertures 90a, b sized and configured to receive the spring loaded buttons 88a, b. To engage the left and right handle and thigh bars 34, 36 to the left and right posts 86a, b, distal end portions 92a, b may have a hollow center. The distal end portions 92a, b of the left and right handle and thigh bars 34, 36 may be slid over the left and right posts 86a, b. The left and right posts 86a, b may be sized and configured to have a close fit with the distal end portions 92a, b. The left and right posts 86a, b are inserted into the distal end portions 92a, b until the spring loaded buttons 88a, b spring up into the apertures 90a, b to secure the left and right handle thigh bars 34, 36 to the left and right posts 86a, b. To remove the left and right handle and thigh bars 34, 36, the spring loaded buttons 88a, b are pushed downward and out of the apertures 90a, b. The left and right handle and thigh bars 34, 36 may be slid off of the left and right posts 86a, b. To ensure that the skier does not lose the left and right handle and thigh bars 34, 36 a bungee cord or other band 89 may be attached to the left and right posts 86a, b and the left and right handle and thigh bars 34, 36. The left and right handle and thigh bars 34, 36 may be laid against the frame 32. The left and right handle and thigh bars 34, 36 may be secured to the frame with a bungee cord or other fastening device.

The left and right handle and thigh bars 34, 36 may each define a handle portion 100a, b and a thigh portion 102a, b, as shown in FIG. 6. The thigh portions 102a, b may be positioned medially with respect to the handle portions 100a, b. The thigh portions 102a, b may be covered with a soft sponge or cushion such that when the skier's thighs rest upon the thigh portions 102a, b, (see FIG. 1), the thigh portions 102a, b do not cause discomfort to the rider or skier 22. The handle portions 100a, b may be sized and configured to receive the left and right hands of the skier 22. The handle portions 100a, b may be covered with a friction material such as handle grips commonly used on a bicycle.

The seat frame 84 may have left and right bars 104a, b, as shown in FIG. 6. The left and right bars 104a, b may extend from the upper forward portion of the frame 32 and generally horizontally over the rear portion of the frame 32. The left and right bars 104a, b may be skewed outward as the left and right bars 104a, b extend toward the rear portion of the frame 32. A cross bar 106, may be attached to rear distal end portions 108a, b of the left and right bars 104a, b. The seat 96 may be permanently attached, removably attachable, selectively adjustable to the seat frame 84 in any manner known in the art shown herein or developed in the future. By way of example and not limitation, a plurality of screws may be inserted through the left and right bars 104a, b and engaged to a bottom surface of the seat 96. Alternatively, although not shown, a seat post of a bicycle may be attached to the seat frame 84 via welding, fastening or other attachment methods known in the art or developed in the future. By way of example and not limitation, the seat post may have a saddle clamp typically used for a bicycle. The seat 96 may have saddle rails. The saddle rails may be adjustably attachable to the saddle clamp in a forward/rearward motion as well as a tilting orientation. The seat 96 may be a bicycle seat such as one that is sold under the trademark FORTE CONTOUR.

Figure 5:
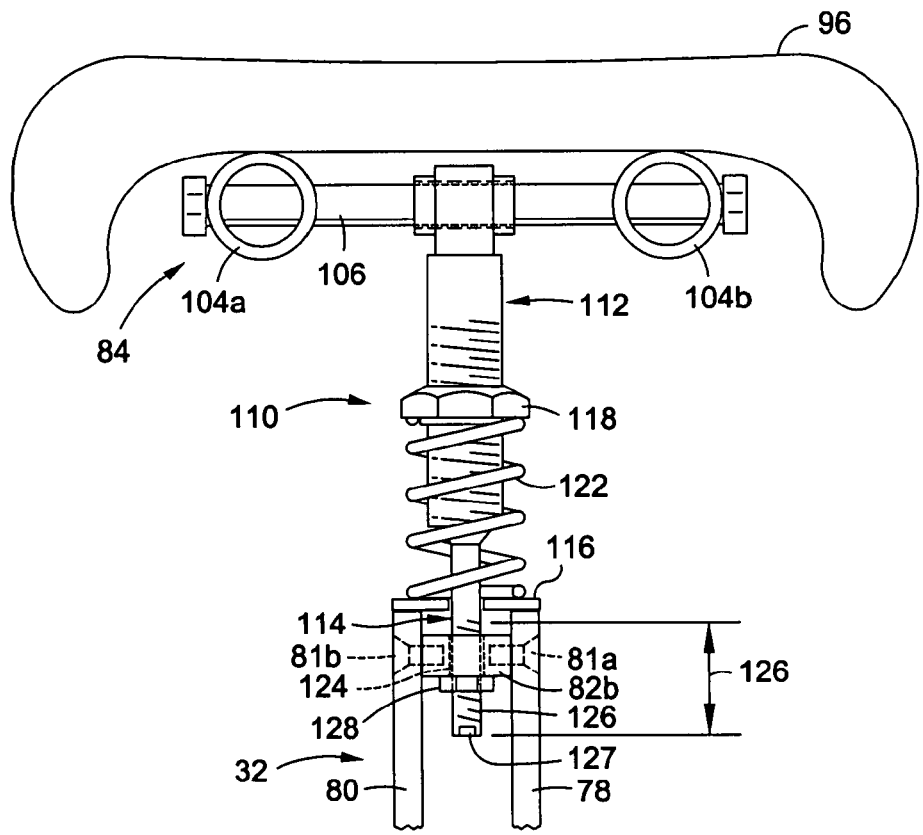
FIG. 5 is a rear view of the seated skiing device shown in FIG. 3 and illustrating a shock absorber.

A shock absorber 110 may be attached to the seat frame 84 and the frame 32, as shown in FIG. 5. In particular, the shock absorber 110 may define an upper distal portion 112 and a lower distal portion 114. The upper distal portion 112 may be a gas charged cylinder. The lower distal portion 114 may be a rod slideably disposable within the gas charged cylinder 112. The upper distal portion 112 may be attached to the seat frame 84. Also, the lower distal portion 114 may be attached to the frame 32. As the skier rides down the snow-covered downhill terrain in the seated position with the seated skiing device 10, bumps in the snow impart gyrations to the seated skiing device 10. These gyrations are absorbed by the shock absorber 110. The attachments made between (1) the upper distal portion 112 and the seat frame 84 and (2) the lower distal portion 114 and frame 32 may be made in any manner known in the art or developed in the future.

Figure 9:
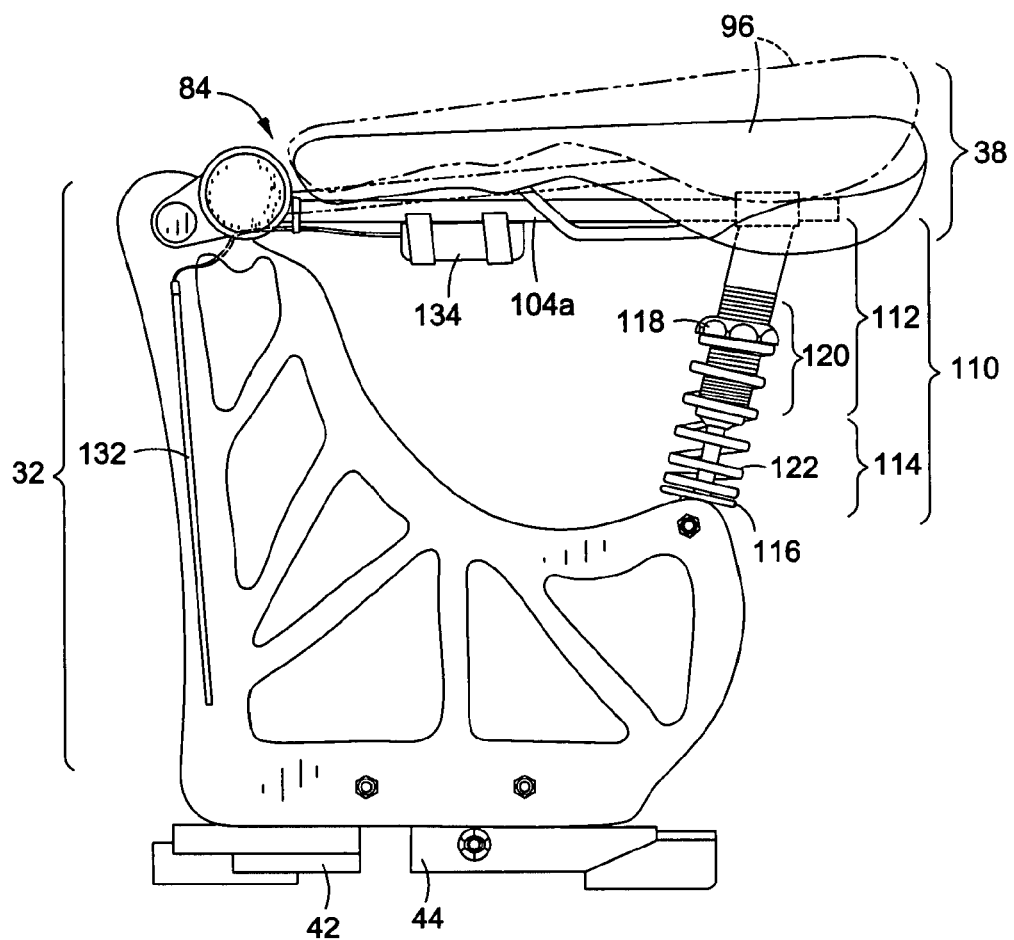
FIG. 9 is a side view of the seated skiing device shown in FIG. 2 and illustrating the pivotable nature of a seat of the seated skiing device.

As shown in FIG. 9, a lower collar 116 may be disposed about the lower distal portion 114. An upper collar 118 may be threadably attached to a threaded portion 120 of the upper distal portion 112. A spring 122 may be disposed between the lower collar 116 and upper collar 118. The shock absorber 110 may provide stiffer or looser suspension by compressing or loosening the spring 122. To compress or loosen the spring 122, the upper collar 118 may be rotated clockwise or counterclockwise. Compression of the spring 122 provides greater resistance to a downward force imposed on the top of the seat 96 or an upward force imposed on the frame 32 by the snow ski 14. In use, the rider traverses down a snow-covered downhill terrain. Bumps in the snow will cause the snow ski 14 to gyrate up and down. Such gyration imposes forces on the frame 32 and are absorbed by the shock absorber 110 to provide a more comfortable ride to the skier 22.

Referring now to FIG. 5, the seat 96 may be raised or lowered by raising or lowering the shock absorber 110. In particular, the first and second parts 78, 80 of the frame 32 may be attached to each other at the rear portion thereof with the spacer 82b. The spacer 82b may have a threaded through hole 124. The lower distal portion 114 may also have a threaded portion 126. Such threaded portion 126 may be threadable into the threaded through hole 124 of the spacer 82b to raise or lower the seat 96. The lower distal portion 114 may be threaded into or out of the threaded through hole 124 of the spacer 82b with an allen wrench insertable into a receiver 127 by rotating the lower distal portion 114 into or out of the threaded through hole 124. A locknut 128 may be threaded onto the threaded portion 126 of the lower distal portion 114 and jammed against the spacer 82b to lock the position of the lower distal portion 114 and the height of the seat 96. It is also contemplated that the seat 96 may be lowered or raised by attaching a seat tube to the seat frame 84 wherein the seat tube is sized and configured to receive a seat post as is typical in a bicycle. The seat post may be fastened or secured to the seat tube in a similar manner compared to a typical bicycle or via welding, adhesive or other methods known in the art.

Optionally, the seated skiing device 10 may have a leash 46, as shown in FIG. 2. The leash 46 may be a standard surfboard leash or snowboard leash. In particular, a first distal end of the leash 46 may be looped around the frame 32. A second distal end of the leash 46 may be removably securable to the skier's leg or arm via methods known in the art or developed in the future. The leash 46 prevents loss of the seated skiing device 10.

Figure 10:
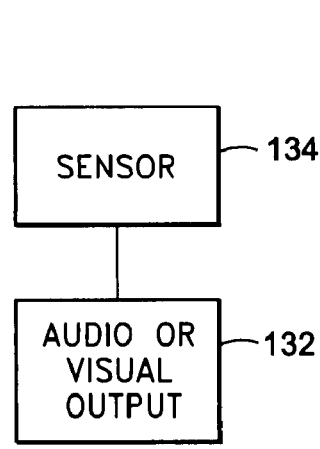
FIG. 10 is a schematic diagram of a sensor and an audio/visual output.

The seated skiing device 10 may optionally also have an audio or visual output 132 activatable by a sensor 134, as shown in FIGS. 9 and 10. The audio output 132 may be a speaker, horn, bell, and/or other sound producing device. The visual output 132 may be a video screen, neon light, light bulb, light illuminating device, or other visual output device. The audio or visual output 132 may initiate and/or vary based on a sensed condition of the sensor 134. The sensor 134 may be an accelerometer, sound meter, light meter, or any other type of environmental sensor. As shown in FIGS. 2 and 9, the visual output 132 may be a strip of light. The strip of light 132 may be attached to the frame 32. The strip of light 132 may be in electrical communication with the sensor 134 which may be an accelerometer. As such, as the seated skiing device 10 accelerates or decelerates down the snow covered downhill terrain, the strip of light 132 is illuminated. The intensity of the illumination and/or the illumination/de-illumination of the strip of light 132 may be based on the sensed acceleration/deceleration of the seated skiing device 10 sensed by the sensor 134.

Figure 11:
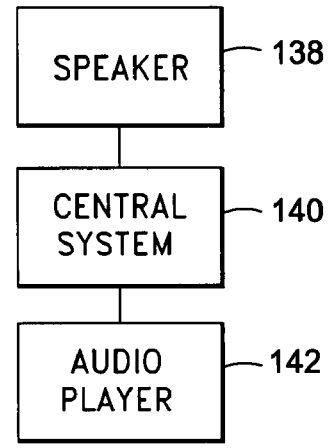
FIG. 11 is a schematic diagram of an audio system.

Optionally, the seated skiing device 10 may have an audio system, as shown in FIG. 11. The audio system may comprise one or more of the following components, namely, a speaker 138, control system 140, an audio player 142 (e.g., Ipod, Mp3 Player, etc.) the speaker 138 may be a pair of ear buds, ear head phones, a traditional speaker, or other audio output device. The control system 140 may control the audio player 142 to play different songs, search for different songs, fast forward, rewind, stop, pause as well as other functions that are necessary for the operation of the audio player 142. The control system 140 may be separate and apart from the audio player 142 or the control system 140 may be integral with the audio player 142. One or more components 138, 140, 142 of the audio system 136 may be fixedly attached to the seated skiing device 10. By way of example and not limitation, the speaker 138 may be disposed and fixedly attached between the first and second parts 78, 80 of the frame 32. The control system 140 may be attached adjacent the left and right handle and thigh bars 34, 36. The control system may be in electrical communication with the speaker 138 and/or audio player 142. The audio player 142 may be attached to the underside of the seat frame 84.

In use, to ride the seated skiing device 10, the ski boot is removed from the snow ski and the seated skiing device 10 may be attached to the snow ski 14. In particular, the release lever 144 (see FIG. 2) of the heel binding 18 is pushed downward to release the ski boot 20 from the toe and heel bindings 16, 18 of the snow ski 14. The toe protrusion 42 of the seated skiing device 10 is wedged into the toe binding 16 of the snow ski 14. The heel protrusion 44 is then pushed downward on the heel binding 18 of the snow ski 14. The heel binding 18 then engages the heel protrusion 44. Simultaneously, the release lever 144 is traversed upward. At this point, the seated skiing device 10 is engaged to the snow ski 14. Beneficially, the seated skiing device 10 is attachable to the snow ski 14 without any additional tools. After the seated skiing device is attached to the snow ski 14, the nose of the snow ski is pointed downhill while the skier stands in front of the left and right handle and thigh bars 34, 36. The left and right handle and thigh bars 34, 36 may be urged forward against the skier's legs by gravity. The skier then grasps the handle portions 100*a, b* while simultaneously sitting on the seat 96, as shown in FIG. 1. The skier's thighs are positioned over the thigh portions 102*a, b* of the left and right handle and thigh bars 34, 36. To make left and right turns on the seated skiing device 10, the skier places pressure on the left edge or right edge of the snow ski 14 by leaning towards the left side or right side or applying pressure to the left or right handle and thigh bars 34, 36 with his/her hands and/or thighs.

In an aspect of the seated skiing device 10, the seated skiing device 10 may be carried in a backpack. In particular, the left and right handle and thigh bars 34, 36 are foldable into the collapsed position. In the collapsed position, the skier may stow the seated skiing device 10 in a backpack. As such, the skier may ride down the snow covered downhill terrain in the traditional upright position. At certain times during the day, the skier 22 may disengage his/her ski boot 20 from the snow ski 14. The seated skiing device 10 may be removed from the backpack and the left and right handle and thigh bars 34, 36 may be traversed to the extended position. The seated skiing device 10 may be engaged to the snow ski 14. The skier 22 may then pack the one remaining snow ski in a snow ski backpack. The skier 22 may then ride down the snow covered downhill terrain in the seated position.

In an aspect of the seated skiing device 10, the same has been illustrated with typical alpine bindings which fix the ski boot 20 to the snow ski 14 at the toe and heel. It is also contemplated that the toe and heel bindings 16, 18 may be replaced with cross-country bindings, telemark bindings, alpine ski touring bindings, ski board and snow blade non-release bindings. In all of these cases, the seated skiing device 10 may be designed to be removably attachable to such alternate bindings.

Figure 13:
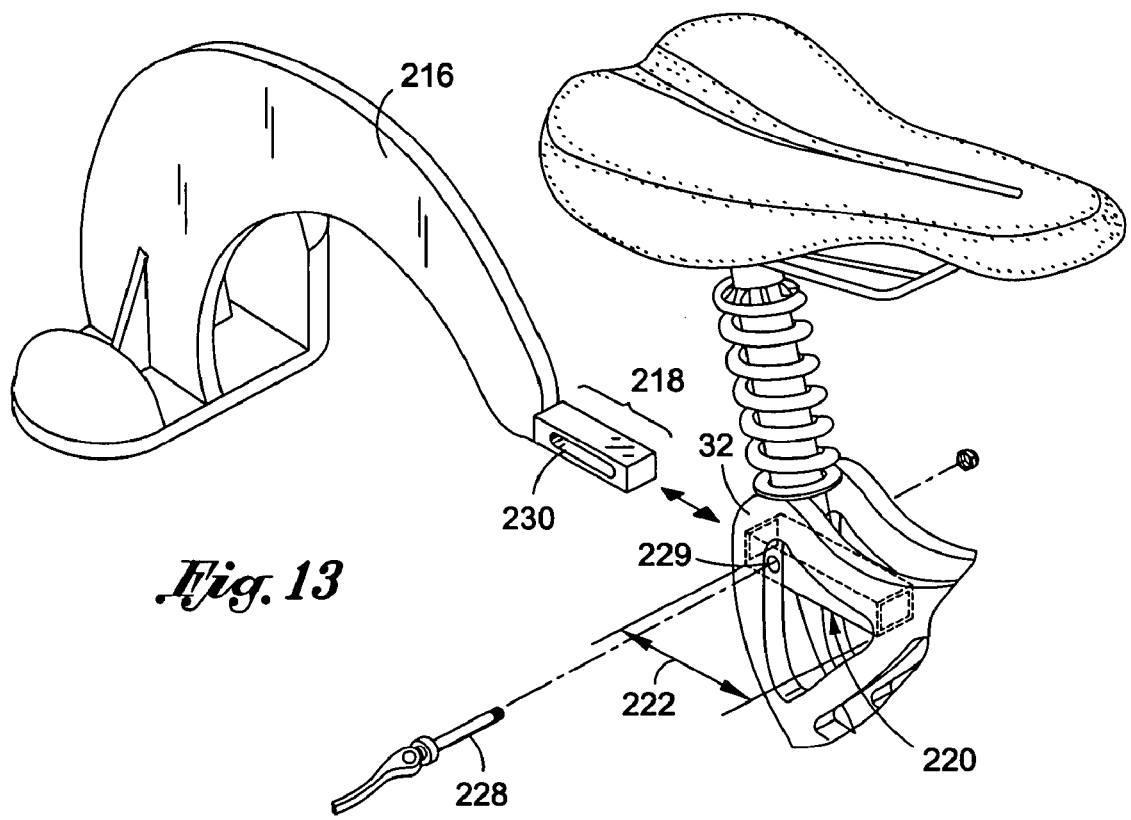
FIG. 13 is an exploded view of the seated snowboarding device shown in FIG. 11 wherein an extension has a tongue removably attachable to a receiver of a frame.

In a second embodiment, the seated snowboard device 12 is shown in FIGS. 12 and 13. The seated snowboard device 12 may incorporate all of the features discussed above in relation to the seated skiing device 10 except that the seated snowboard device 12 is removably attachable to front and rear bindings 24, 26 of a snowboard 28. In particular, the seated snowboard device 12 may have a front protrusion 204 and a rear protrusion 206. Each of the front and rear protrusions 204, 206 may have a toe portion 208*a, b* and a heel side portion 210*a, b*. The toe portions 208*a, b* may be sized and configured to receive a toe strap 212*a, b* of the front and rear bindings 24, 26. Similarly, the heel side portions 210*a, b* of the front and rear protrusions 204, 206 may be sized and configured to receive upper straps 214*a, b* of the front and rear bindings 24, 26. The heel side portions 210*a, b* may be elevationally higher compared to the toe portions 208*a, b*. Moreover, the toe portions 208*a, b* and the heel side portions 210*a, b* may have a curved configuration. The rear protrusion 206 may be attached to the frame 32 via an extension 216.

The extension 216 may be removably attached to the frame 32 via a tongue 218 and a receiver 220, as shown in FIG. 13. In particular, the tongue 218 may have a square cross sectional configuration. The receiver 220 may also have an aperture having a square cross sectional configuration. The expandable tongue 218 may have a close fit with the receiver 220 such that the extension 216 does not substantially wiggle once the tongue 218 is inserted into the receiver 220. The receiver 220 may have a length 222 which is substantially long such that a distance 224 (see FIG. 12) between the front and rear protrusions 204, 206 may be adjusted to equal a distance 226 (see FIG. 12) between the front and rear bindings 24, 26 of the snowboard 28. When the distance 224 between the front and rear protrusions 204, 206 is substantially equal to the distance 226 between the front and rear bindings 24, 26, the tongue 218 may be locked in place in the receiver 220 via a fastener 228. The fastener 228 may be a quick release lever as described above and shown in FIG. 4A. The bolt of the quick release lever 228 may be inserted into aligned apertures formed in the frame 32. The aligned apertures 229 formed in the frame 32 may also be aligned to an elongate slot 230 through which the bolt of the fastener 228 is also inserted. When the tongue 218 is being slid in and out of the receiver 220 to adjust the distance 224 between the front and rear protrusions 204, 206, the bolt of the fastener 228 slides within the elongate slot 230. When the distance 224 between the front and rear protrusions 204, 206 is equal to the distance 226 between the front and rear bindings 24, 26, the fastener 228 is tightened, as discussed above, to lock the position of the tongue 218 in the receiver 220.

In use, the seated snowboard device 12 may be attached to the snowboard 28 such that the front and rear bindings 200, 202 of the snowboard 28 are in a goofy stance or regular stance. For example, in FIG. 12, the front and rear bindings 24, 26 are illustrated such that the rider rides down the snow covered downhill terrain in a regular stance. In the regular stance, the left foot of the snowboarder is pointed downhill. The seated snowboard device 12 is attached to the snowboard, specifically, the front and rear bindings 24, 26 such that the front and rear bindings 24, 26 are in a regular stance when the rider or snowboarder is riding down the snow covered downhill terrain with the seated snowboard device 12. Alternatively, if the snowboard 28 has front and rear bindings 24, 26 set to a goofy stance rider the seated snowboard device 12 is merely rotated 180° and attached to the snowboard such that the snowboarder is riding down the snow covered downhill terrain with the front and rear bindings 24, 26 in a goofy stance orientation but in this situation the snowboarder is riding backwards on the snowboard 28. Accordingly, the seated snowboard device 12 may be removably attachable to a snowboard 28 whether the front and rear bindings 24, 26 are set to a regular stance rider or a goofy stance rider. Moreover, the seated snowboard device 12 is adjustable, namely, the front and rear protrusions 204, 206 may be spread apart or drawn closer to each other such that the front and rear protrusions 204, 206 may be matched to the front and rear bindings 24, 26, as discussed above.

In an aspect of the seated snowboarding device 12, the seated snowboarding device 12 may be disassembled by removing the tongue 218 from the receiver 220. In particular, the fastener 228 is loosened and removed from the elongate slot 230 and the apertures 229. The tongue 218 may be slid out of the receiver 220. The extension 216, frame 32 and the fastener 228 may be compactly stored in a backpack. In this manner, the snowboarder may traverse down a snow covered downhill terrain in the traditional upright position with the seated snowboarding device 12 in a backpack. During the day, the snowboarder may remove his/her boots from the front and rear bindings 24, 26 of the snowboard 28 and engage the seated snowboarding device 12 such that the snowboarder may ride down the snow covered downhill terrain in the seated position. In particular, the tongue 218 is inserted into the receiver 220 until a distance 224 between the front and rear protrusions 204, 206 is about equal to a distance 226 between the front and rear bindings 24, 26 of the snowboard 28. The fastener 228 is inserted into the aligned apertures 229 and the elongate slot 230 and tightened to lock the position of the tongue 218 within the receiver 220. The rider may now strap the front and rear protrusions 204, 206 into the front and rear bindings 24, 26. The snowboarder may now ride down the snow covered downhill terrain in the seated position with the seated snowboarding device 12.

In an aspect of the seated snowboarding device 12, the same has been described in relation to strap-in bindings. However, it is also contemplated that the front and rear protrusions 204, 206 may be adapted, sized and configured to be removably attachable to step-in bindings, flow bindings, and other bindings that are known in the art or developed in the future.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A downhill snowboard device mountable to a snowboard having a front binding and a rear binding defining a binding distance therebetween, the downhill snowboard device comprising:
    a frame;
    a seat attached to the frame for allowing the rider to ride down a snow covered downhill terrain while seated on the seat;
    a front portion attached to the frame and receivable in the front binding of the snowboard;
    a rear portion attached to the frame and receivable in the rear binding of the snowboard, a snowboard device distance defined by the front and rear portions being adjustably settable to equal the binding distance;
    wherein front and rear portions have a tongue telescopingly receivable into an opening so that the tongue may be positioned within the opening at any position for fine tuning the snowboard device distance, the front and rear portions operative to slide and lock into position so as to fit in the front and rear binding of the snowboard.

2. The downhill snowboard device of claim 1 further comprising a fastener insertable into an aperture formed in the front portion and an elongate slot formed in the rear portion wherein the fastener is slideably disposed within the elongate slot for adjusting the snowboard device distance so as to be equal to the binding distance and tightenable for setting the snowboard device distance.

3. The downhill snowboard device of claim 2 wherein the fastener is an overcenter fastener for quick release and adjustment of the protrusion distance.

4. The downhill snow device of claim 2 wherein the elongate slot is aligned longitudinally with the snowboard when the downhill snowboard device is mounted to the snowboard.

5. The downhill snowboard device of claim 1 further comprising a steering handle attached to the frame and disposed transversely with respect to the frame to balance and steer the downhill snowboard device down the snow covered downhill terrain.

6. The downhill snowboard device of claim 5 wherein the steering handle is rotateable so as to be flush with respect to the frame for carrying the downhill snowboard device.

7. A downhill snow ski device mountable to a snow ski having a toe binding and a heel binding defining a binding distance therebetween, the downhill snow ski device comprising:
    a frame defining a lower portion and an upper portion;
    a seat attached to the frame for allowing the rider to ride down a snow covered downhill terrain while in a seated position, the seat being pivotally attached to the upper portion of the frame;
    a toe protrusion attached to the frame and receivable in one of the toe and heel bindings of the snow ski;
    a heel protrusion attached to the frame and receivable in one of the toe and heel bindings of the snow ski; and
    a shock absorber attached to the seat and the lower portion of the frame for absorbing shocks imparted to the downhill snowboarding device;
    wherein a pivot axis of the seat is at an elevation at about an upper end portion of the shock absorber.

8. The downhill snow ski device of claim 7 further comprising a steering handle attached to the upper portion of the frame and disposed transversely with respect to the frame to balance and steer the downhill snow ski device down the snow covered downhill terrain.

9. The downhill snow ski device of claim 8 wherein the steering handle is rotateable horizontally or vertically so as to be flush against the frame for carrying the downhill snow ski device in a backpack.

10. The downhill snow ski device of claim 7 further comprising a speaker attached to the frame and an input for receiving audio signals and transmitting the audio signals to the speaker.

11. The downhill snow ski device of claim 7 further comprising an output system comprising:
    an output device attached to the frame;
    a sensor for producing a signal upon sensation of a condition, the sensor being in communication with the output device;
    wherein the output device is actuated when the sensor senses the condition and transmits the signal to the output device.

12. The downhill snow ski device of claim 11 wherein the output device is a speaker or a light.

13. The downhill snow ski device of claim 11 wherein the sensor is a sound sensor, a light sensor, a speed sensor, a pressure sensor or an accelerometer.

14. The downhill snow ski device of claim 7 further comprising a sound system comprising:
    a speaker attached to the frame;
    a mp3 player; and
    an input which is operative to receive signals from the mp3 player, the input being in communication with the speaker.

15. The downhill snow ski device of claim 7 further comprising a shock absorber attached to the seat and the frame for absorbing shocks imparted to the downhill snow ski device.

16. The downhill snow ski device of claim 7 wherein the heel protrusion is attached to an extension having a tongue and the frame has a receiver sized and configured to telescopingly receive the tongue, the tongue having an elongate slot, the receiver having aligned apertures, and the downhill snow ski device further comprising a fastener insertable into the aligned apertures and the elongate slot, the tongue being insertable into the receiver at selective depths and the fastener tightened such that a protrusion distance defined by the toe and heel protrusions is fixed to the binding distance defined by the binding distance of the front and rear bindings.

17. The downhill snow ski device of claim 7 wherein the upper portion of the frame is the upper half of the frame.

* * * * *